US006673380B2

(12) United States Patent
Yang et al.

(10) Patent No.: US 6,673,380 B2
(45) Date of Patent: *Jan. 6, 2004

(54) FORTIFIED CONFECTIONERY DELIVERY SYSTEMS AND METHODS OF PREPARATION THEREOF

(75) Inventors: BaoKang Yang, Evansville, IN (US); Sarah B. Martinez, Newburgh, IN (US)

(73) Assignee: McNeil-PPC, Inc., Skillman, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,170

(22) PCT Filed: Nov. 17, 1998

(86) PCT No.: PCT/US98/24554

§ 371 (c)(1),
(2), (4) Date: Oct. 12, 1999

(87) PCT Pub. No.: WO99/26491

PCT Pub. Date: Jun. 3, 1999

(65) Prior Publication Data

US 2002/0025360 A1 Feb. 28, 2002

(51) Int. Cl.[7] .............................. A23G 3/00; A23L 1/302
(52) U.S. Cl. .............................. 426/72; 426/73; 426/74; 426/660
(58) Field of Search ................. 424/466, 103, 424/648; 426/649

(56) References Cited

U.S. PATENT DOCUMENTS

| | | | |
|---|---|---|---|
| 3,730,735 A | * 5/1973 | Rash, Jr. et al. ............... 99/134 |
| 4,276,312 A | * 6/1981 | Merritt ......................... 426/96 |
| 4,327,076 A | 4/1982 | Puglia et al. ................. 424/38 |
| 4,327,077 A | 4/1982 | Puglia et al. ................. 424/38 |
| 4,543,262 A | 9/1985 | Michnowski ............... 426/306 |
| 4,545,989 A | * 10/1985 | Becker et al. ............... 424/154 |
| 4,582,709 A | * 4/1986 | Peters et al. .................. 426/74 |
| 4,610,884 A | * 9/1986 | Lewis, III et al. .......... 426/103 |
| 4,753,805 A | * 6/1988 | Cherukuri et al. ............. 426/5 |
| 4,832,971 A | 5/1989 | Michnowski ............... 426/302 |
| 4,859,475 A | 8/1989 | Michnowski ................. 426/72 |
| 4,882,153 A | * 11/1989 | Yang et al. .................. 424/440 |
| 4,931,300 A | 6/1990 | Monte ......................... 426/35 |
| 5,223,264 A | * 6/1993 | Wehling et al. ............. 424/466 |
| 5,384,148 A | 1/1995 | Lynch et al. ................ 426/660 |
| 5,445,837 A | 8/1995 | Burkes et al. ................. 426/74 |
| 5,464,649 A | 11/1995 | St. John et al. |
| 5,468,506 A | 11/1995 | Andon ......................... 426/74 |

(List continued on next page.)

FOREIGN PATENT DOCUMENTS

| | | |
|---|---|---|
| AU | 9226292 | 4/1993 |
| AU | 9671866 B2 | 5/1997 |
| EP | 0166440 A2 | 1/1986 |
| EP | 0183840 B1 | 6/1986 |
| EP | 0190826 A2 | 8/1986 |
| EP | 0217109 A2 | 4/1987 |
| EP | 0227603 A2 | 7/1987 |
| EP | 0228999 A2 | 7/1987 |
| EP | 0239540 B1 | 9/1987 |
| EP | 0278994 A1 | 8/1988 |
| EP | 0370296 B1 | 5/1990 |
| EP | 0371584 B1 | 6/1990 |
| EP | 0372695 A1 | 6/1990 |
| EP | 0396335 B1 | 11/1990 |
| EP | 0458751 A1 | 11/1991 |
| EP | 0472428 A2 | 2/1992 |
| EP | 0539374 B1 | 5/1993 |
| EP | 0565706 B1 | 10/1993 |
| EP | 0580240 A1 | 1/1994 |
| EP | 0679339 A1 | 11/1995 |
| EP | 0753296 A2 | 1/1997 |
| GB | 2099278 A | 12/1982 |
| GB | 2119647 A | 11/1983 |
| GB | 2183438 A | 6/1987 |
| GB | 2233228 A | 1/1991 |
| WO | WO 86/00004 A1 | 1/1986 |
| WO | WO 96/38049 A1 | 12/1996 |
| WO | WO 97/25876 A1 | 7/1997 |
| WO | WO 98/07448 A1 | 2/1998 |
| WO | WO 98/58549 A1 | 12/1998 |
| WO | WO 99/48379 A1 | 9/1999 |
| WO | WO 99/62351 A1 | 12/1999 |
| WO | WO 00/01245 A2 | 1/2000 |
| WO | WO 00/02462 A1 | 1/2000 |
| WO | WO 00/06127 A1 | 2/2000 |
| WO | WO 00/10402 A1 | 3/2000 |
| WO | WO 00/13522 A1 | 3/2000 |
| WO | WO 00/53024 A1 | 9/2000 |

OTHER PUBLICATIONS

Bartlett, J., The Cook's Dictionary and Culinary Reference, A Comprehensive Definitive Guide to Cookign and Food, pp. 80–81, 1931.*

Harris, N., M. Peterson, and S. Crespo, A Formulary of Candy Products, Chemical Publishing Co., p. 69, 1991.*

Troller, J. and J.H.B. Christian, Water Actvity and Food, Academic Press, p. 116, 1978.*

J. M. deman, Principles of Food Chemistry, Van Nostrand Reinhold, pp. 143–145, 148–152, 163–164, 174–180, 1990.*

Chocolate, Cocoa, and Technology: Science and Technology 3rd Ed., Chapman and Hall, pp. 788–789, 1989.*

Primary Examiner—Arthur L. Corbin

(57) ABSTRACT

Chewy confectionery products, and processes for producing said products, are provided as delivery systems for minerals such as calcium. The carbohydrates of the fortified confectionery products include at least one reducing sugar and one non-reducing sugar in a weight ratio of about 1:0.2 to about 1:1 reducing sugar:non-reducing sugar. The chewy confectionery products offer a matrix for about 0.2 wt. % to 45 wt. % of a fortifying component while maintaining a smooth and soft texture.

78 Claims, No Drawings

U.S. PATENT DOCUMENTS

| | | | |
|---|---|---|---|
| 5,571,441 A | * 11/1996 | Andon et al. | 252/1 |
| 5,607,716 A | 3/1997 | Doherty et al. | |
| 5,637,313 A | 6/1997 | Chau et al. | 424/440 |
| 5,804,247 A | 9/1998 | Cherukuri et al. | 426/660 |
| 5,902,797 A | 5/1999 | Bell et al. | 514/547 |
| 5,919,668 A | 7/1999 | Mandai et al. | 435/97 |
| 5,922,346 A | 7/1999 | Hersh | 435/197 |
| 5,968,896 A | 10/1999 | Bell et al. | 424/24 |
| 6,143,335 A | 11/2000 | McKenzie | 514/3 |

* cited by examiner

FORTIFIED CONFECTIONERY DELIVERY SYSTEMS AND METHODS OF PREPARATION THEREOF

FIELD OF THE INVENTION

This invention relates to confectionery delivery systems for nutrients. A process for preparing nutritional confectionery products is also provided.

BACKGROUND

Vitamin and mineral supplements often provide fortification otherwise not present in regular dietary intake. The supplements may be delivered in a variety of known forms, such as by tablet, capsule, powders, edible food products and so on. Regardless of the number of delivery systems available, there is a continuing need to provide alternative forms of supplements that are appealing, and therefore increase the likelihood of compliance to those in need of ingesting such supplements. Confectionery based supplements are appealing because they provide good tasting delivery systems.

One of the problems associated with preparing acceptable delivery systems for minerals and vitamins, particularly confectionery delivery systems, is obtaining a product with an acceptable taste, stability, and texture. Undesirable organoleptic characteristics, such as pasty, dry, dusty, chalky, bitterness and aftertaste are problematic in delivery minerals and vitamins in an edible matrix, particularly a chewable matrix. For example, a common occurrence in preparing a calcium fortified confectionery is that the product tends to taste chalky or gritty. Additional challenges in preparing good tasting supplements is that the solubility or strong flavor of the vitamins and/or minerals make it difficult to sustain a good taste throughout the eating process.

Further, when fruit flavored chews are made, particularly those with citric acid, the confectionery products may have a strong acidic, sour flavor or aftertaste. Further still, when the fruit chew employs an acid component, the calcium used to fortify the chew may react with the acid component to form a gas thereby impairing undesirable characteristics for the end product confectionery or prematurely react during product manufacture.

Within the area of fortification, the relationship between certain vitamins and minerals and bone mineral content and associated bone loss, formation, and/or restoration continues to generate much interest. Providing a delivery system having an acceptable matrix to deliver vitamins and minerals specific to the area of bond content would be particularly desirable.

As used herein, weight percentages (wt. %) are based on the total weight of said confectionery composition.

SUMMARY OF INVENTION

The above-described problems and needs have been solved with the discovery of a chewy confectionery composition comprising from about 0.2 weight percent (wt. %) to about 45 wt. % of a fortifying component comprising a vitamin source, a mineral source, or a mixture thereof; from about 3 to about 18 wt. % of a fat; from about 40 wt. % to about 70 wt. % of a carbohydrate comprising at least one non-reducing sugar and at least one reducing sugar, wherein said reducing sugar:non-reducing sugar ratio ranges from about 1:0.2 to about 1:1. Also provided is a chewy confectionery comprising from about 0.2 wt. % to about 45 wt. % of a fortifying component, from about 3 to about 18 wt. % of a fat; from about 40 wt. % to about 70 wt. % of a carbohydrate comprising from about 10 to 50 wt. % of an oligosaccharide, a polysaccharide or a mixture thereof and from about 50 to about 90% of a monosaccharide, a disaccharide, or a combination thereof. The matrix of the confectionery composition provides a method of delivering vitamins and minerals in a manner that retains the desirable characteristics for a confectionery such as good taste, good texture, and substantially no aftertaste.

In a preferred embodiment, from about 2 to about 32 wt. % of a calcium is employed in the fortifying composition. In yet another preferred embodiment, the confectionery is prepared using an encapsulated citric acid that provides a fruit flavored chew. In addition to providing a composition capable of incorporating high percentages of a fortifying composition, also provided is a process improvement for the preparation of a confectionery composition incorporating calcium. In particular, said process comprises the steps of cooking a confectionery comprising from about 3 to about 18 wt. % of a fat; from about 40 wt. % to about 70 wt. % of a carbohydrate comprising at least one reducing sugar and at least one non-reducing sugar present in a ratio of reducing sugar:non-reducing sugar of from about 1:0.2 to about 1:1, and from about 0 to about 10 wt. % of a protein to form a precooked mass and thereafter adding to said precooked mass said fortifying component comprising from about 0.2 to about 45 wt. %. All weight percentages used herein are based on the total weight of the complete confectionery composition.

Advantages presented with the fortified confectionery include obtaining high levels of fortifying components in the confectionery without compromising taste and texture. The preferred products are soft without exhibiting stickiness and do not taste chalky or gritty.

DETAILED DESCRIPTION

As used herein, dextrose equivalent (DE) is defined as the percent of reducing sugars on a dry basis calculated as dextrose. As familiar to one skilled in the art, glucose (or corn) syrups are formed by reacting a starch with an acid and/or enzyme. The DE is a measurement of the degree of hydrolysis that starches undergo to yield different DE syrups. As used herein, glucose and dextrose are used interchangeably. Standard corn syrups are defined as having about a DE value of approximately 42. Syrup processed to have a "high" DE using has a value of approximately 65 DE. The higher the level of DE in a carbohydrate component, the sweeter the ingredient. With the sweetness factor, the high DE carbohydrates may also contribute to negative product characteristics, such as, greater tendency to crystallize (could lead to a product defect if there's too much or too big of a crystal formulation); less viscosity (could lead to a product that is too sticky, inability to bold form); tendency to brown (could lead to flavor problems and coloration problems); tendency to be more hygroscopic (could lead to product that has too much crystallization); and so on. A "reducing sugar" is defined as a sugar which can chemically react with a special copper reagent known as Fehlings solution (alkaline solution), whereby the "reducing" sugar will reduce this copper solution to copper oxide (cuprous oxide). A "non reducing sugar" is defined as a sugar that will not react with the special copper reagent. Sucrose is an example of a common non-reducing sugar. Corn syrups, fructose and milk sugars are examples of reducing sugars.

Typically, in caramels, toffees and other chewy confectionery products, the carbohydrates are 1 part reducing sugars and 1.2 to 1.4 parts non-reducing sugar (sucrose). Unexpectedly, in the present invention, the conventional ratio of carbohydrates does not work well because they provide a product that is too hard and grainy in texture. On the other hand, too high of a ratio of reducing sugar to non-reducing sugar will provide a confectionery having a texture that is too sticky and runny. Accordingly, large-scale manufacture of the fortified chew was found technically unfeasible.

The carbohydrates used in the invention may be selected from any source commonly used in the art of preparing confectionery products (see, e.g. *Food Technology*, March, 1991, pp. 148–149, hereby incorporated by reference). More particularly, the carbohydrate preferably has at least one reducing sugar and at least one non-reducing sugar. The carbohydrate preferred may also be defined as comprising from about 10 to 50 wt. % of an oligosaccharide, a polysaccharide or a mixture thereof and from about 50 to about 90% of a monosaccharide, a disaccharide, or a combination thereof. Sugars falling into the category of monosaccharide, disaccharide, etc. are readily ascertainable by one skilled in the art (see, e.g. *Food Technology* article cited herein). More preferably from 20 to 50 wt. %, most preferably from 22 to 36 wt. % of the carbohydrate is selected from oligosaccharides, polysaccharides and mixtures thereof. The ratio of the reducing sugar:non-reducing sugar is preferably from about 1:0.2 to 1:1, more preferably from 1:0.3 to 1:0.8, and most preferably from 1:0.3 to 1:0.4. In addition to the reducing and non-reducing sugars, the carbohydrate fraction of the confectionery may include other carbohydrate components such as lactose, maltodextrin and the like (which will permit formulations having fewer calories). More particularly, various corn syrups (starch hydrolysates), polydextrose (polymer of dextrose with sorbitol and an acid), sucrose, dextrose, fructose, lactose, maltose, brown sugar, cane sugar, and beet sugar; invert sugar; sugar alcohols (sorbitol, maltitol, mannitol, xylitol), honey; lycasin and mixtures thereof may be selected as the carbohydrate component. More preferably employed is at least one reducing sugar selected from corn syrup (24 DE to 65 DE), high fructose corn syrup, corn syrup solid, high maltose corn syrup, fructose, invert sugar, and mixtures thereof is employed with at least one non-reducing sugar (such as sucrose and the like) is used. In addition to the non-reducing and reducing sugars, artificial sweeteners may also be used as sweetening agents, such as aspartame, saccharin, lactitol, sucralose, acesulfame-K, stevia; Neohesperidine DC, cyclamates and the like. Particularly preferred carbohydrates are sucrose (the non-reduced sugar) combined with reducing sugars described in Table 2 below.

TABLE 2

Preferred Sources of Reducing Sugars

| Corn Syrup-42DE | Corn Syrup-62/63 DE | High Maltose Corn Syrup-42 DE | High Fructose Corn Syrup | Fructose |
|---|---|---|---|---|
|  | X | X |  |  |
| X |  |  |  | X |
|  |  | X | X |  |
| X |  |  | X |  |
|  | X | X | X |  |
| X | X |  | X |  |
| X | X |  |  |  |

As described in the Table 2, the non-reducing sugar, preferably sucrose, may be combined with various combinations of reducing sugars selected from the following combinations: (1) a corn syrup having a DE of 62/63 with a high maltose corn syrup having a 42 DE, (enzymatically treated corn syrup resulting in the production of a maltose); (2) a corn syrup (42 DE) and fructose; (3) a high maltose corn syrup (42DE) with a high fructose corn syrup; (4) a corn syrup (42 DE) and a high fructose corn syrup; (5) a corn syrup (62/63 DE), high maltose corn syrup, and a high fructose corn syrup;(6) a corn syrup (42 DE) and a corn syrup (62/63 DE), and a high fructose corn syrup; (7) a corn syrup (42 DE) and a corn syrup (62–63 DE).

The confectionery is defined as having at least about 40 wt. % carbohydrate. Preferably from about 40 wt. % to 70 wt. %, more preferably, from 50 to 60 wt. % of the carbohydrate is employed in the confectionery.

Provided is a chewy, semi-solid confectionery having a matrix appropriate for a delivery of any number of combinations of mineral salts and vitamins. The inventive confectionery delivery system optimally has from about 4 to about 10 wt. %, and preferably between 6 and 8 wt. % moisture. The water activity (Aw) of the confectionery is below approximately 0.65, preferable between 0.4 to about 0.55.

As used herein, water activity, Aw, is defined as equal to Equilibrium Relative Humidity (ERH) divided by 100. ERH is the state of equilibrium state at which the confectionery product neither absorbs nor loses moisture to the environment. In the confectionery, the ERH is influenced by the composition of the syrup phase, particularly the water content thereof, and may be present as free or bound water. The free water influences the storage capabilities of the confectionery which could result in undesired crystallization of the confectionery during storage.

The composition may be processed in any standard candy making machinery, either in a batch process using open pan cooking or in a continuous system. In a continuous system, preferably the basic mix is caramelized and other ingredients added thereafter. The cooked mass may then be poured onto a cooling table, cut and further processed on a standard caramel wrapping machine. The candy may be further processed in any acceptable commercial form including bars, rolls, individually wrapped pieces and so on. The physical characteristics of softness preferably do not interfere with individually wrapping the confectionery products. Wrapping materials may be selected from any known, non-reactive material used in the food industry. The composition may be formulated using known flavor technology (natural, artificial, and nature identical) including preparations as a caramel, chocolate or fruit flavored chew. The caramel flavor may be contributed to the confectionery naturally during the cooking process or commercially by adding caramel powders, dairy products (e.g., milk crumb) and/or other flavoring ingredients. Cocoa butter, cocoa, cocoa liquor, chocolate flavor, and mixtures thereof are particularly useful in providing an acceptable tasting chocolate confectionery. For fruit flavored confectionery products, flavor may be provided by encapsulated citric acid and optionally additional fruit juices and/or fruit flavoring commonly used in food technologies.

Advantages presented with the inventive confectionery are that the confectionery products are highly stable as well as good tasting. Unexpectedly, in one embodiment, calcium fortification provided in the amounts described herein creates a type of matrix that allows for the candies to hold their form at high temperature and high humidity conditions. Further, the confectionery compositions stay soft for a longer than expected time when tested at high temperature and low humidity. Additionally, crystallization of product is lower than expected when the compositions are evaluated under Differential Scanning Calorimetry (DSC) and Dynamic Mechanical Analysis (DMA).

According to the invention, the fortified confectionery shows minimal textural changes when exposed to extremes in humidity and temperature. The confectionery is considered commercially desirable because melting and hardening of the confectionery are avoided during the standard shelf life of the product. As used herein, crystallization is unacceptable if it is present in such a quantity as to manifest a textural (harder) and mouth-feel (gritty) change in the product. Above 35 microns, the crystals in the product will appear coarse to the palate. Temperature fluctuations generally induce crystallization. According to the invention, preferred embodiments showed acceptable crystallization levels (substantially no crystals above 35 microns) when the confectionery samples were subjected to two heat/cool cycles at 37° C./20° C. and 95° C./35° C. for 5 days (as measured DSC and DMA).

Further, preferred embodiments stay "intact" (no weeping) and maintain rigidity when tested for at least about a two-week period at an ambient temperature (25° C.) and high (85%) relative humidity (RH). When preferred embodiments are tested at high temperature (37° C.) and high (85%) relative humidity (RH) for at least about two-week period, the confectionery stays "intact." Although the confectionery may become softer at those adverse conditions, it has the capability to revert back to its original when equilibrated back to ambient conditions. Also, when preferred embodiments are exposed to high temperature (37° C.) and low (33%) RH, for a period of at least about two weeks, the confectionery continues to keep a "soft" texture. In preferred embodiments, the confectionery has a shelf life of commercial acceptability of at least 120, preferably 365, days at room temperature.

The fortifying component may be selected from vitamins, minerals, and combinations thereof. Preferred as a key component is calcium selected from any source fit for dietary consumption (including combinations in various forms). For example, acceptable calcium sources include calcium carbonate, calcium citrate, calcium phosphate, calcium lactate, calcium gluconate, calcium fumarate, calcium aspartate, tricalcium citrate tetrahydrate, and mixtures thereof. Further, natural sources of calcium may also be used such as egg shell, oyster shell, milk calcium, and mixtures thereof. Additionally, calcium salt from reaction between an acid and calcium hydroxides may also be used. Most preferably employed is calcium carbonate. Another mineral favored in the fortifying component associated with bone health is a magnesium source in any acceptable food grade form, including, magnesium oxide, magnesium phosphate, magnesium carbonate, and combinations thereof. Other minerals particularly well suited as incorporated in the matrix because of association with calcium metabolism and bone health include copper (cupric sulfate, cupric carbonate, copper gluconate, cupric oxide); manganese (manganese gluconate, manganese sulfate); zinc (zinc chloride, zinc oxide, zinc gluconate), boron (sodium borate), silicon and mixtures thereof. Amounts of these minerals used in the fortifying component may be adjusted by anyone skilled in the art as long as the amounts do not exceed safety levels. Preferably at least about 10% RDA is included for each selected mineral. Preferably the mineral sources are in a micronized or ultrafine form, optimally with a media particle size of from about 2 to about 10 microns.

Any number of vitamins and combinations thereof may also be part of the fortifying component, including various forms of vitamin D (vitamin D3, cholecalciferol palmitate and vitamin D2, ergocaciferol), vitamin A (palmitate), vitamin E (vitamin E acetate, alpha tocopherols), vitamin B1 (thiamine hydrochloride, thiamine monohydrate), vitamin B2 (riboflavin), vitamin B6 (pyridoxine), niacin, vitamin B12, vitamin C (ascorbic acid, sodium ascorbate), biotin, folacin, pantothenic acid, vitamin K1 (phytonadione), pantothenic acid, and so on.

The total weight percentage of the fortifying component (mineral and vitamin) that may be delivered in the confectionery matrix ranges from about 2 wt. % to about 45 wt. %, preferably from 10 to 45, and more preferably 20 to 25, based on the total weight of the confectionery product.

The matrix provided by the confectionery is particularly appropriate for the delivery of minerals and vitamins appropriate for sustaining bone health. Preferably the confectionery product is prepared using from about 4 to about 32 wt. % of a calcium carbonate (about 95 mg to about 750 mg calcium per piece of total composition, piece defined as from about 5 to 7 grams). More preferably, the confectionery includes from 12.5 wt. % to 32 wt. % calcium carbonate (from 300 mg to 766 mg of calcium per piece) and most preferably about 21 wt. % calcium carbonate (about 500 mg of calcium per piece). Also, the preferred composition for bone health supplementation includes a magnesium salt, favored is magnesium phosphate. When magnesium phosphate is employed as the magnesium salt in the fortifying component, preferably the amount ranges from about 3.6 wt. % to about 12 wt. % (40 mg to 200 mg magnesium phosphate per piece), more preferably from 4.8 to 12 wt. % (40 mg to 100 mg magnesium per piece), and most preferably about 6 wt. % (50 mg per piece).

When the confectionery is formulated as a bone health supplement, in addition to the calcium and magnesium salts, also provided are vitamin D (preferably D2, D3 or mixtures thereof, most preferably D3) and vitamin K (preferably K1). As both of these vitamins are fat soluble, and theoretically absorb best when taken with dietary fat, the fat containing confectionery matrix is an optimal delivery system for both, particularly vitamin K. Preferably, vitamin D is provided in an amount of from about 50–200 IU per piece, preferably 100 IU per piece (e.g., 0.0042 wt. % of vitamin D powder, preferably palmitate powder). Vitamin K may be employed in amounts ranging from about 0.0001 wt. % to about 0.006 wt. % (about 5 to about 300 mcg per piece); more preferably 0.0003 to 0.0008 wt. % (10 to 50 mcg per piece).

In the bone health supplement, vitamin D is selected to promote absorption of the calcium as well as for contributing to homoestasis and bone mineralization. As many populations have decreased fats and oils from their dietary intake, there is concern that certain populations are vulnerable to receiving less than the recommended daily allowance for vitamin K. The current Recommended Daily Allowance (RDA) of Vitamin K is based on the needs for the liver (blood clotting mechanisms) and not on requirements for bone (extrahepatic needs). Emerging scientific data, however, support a relationship between vitamin K and bone strength and accordingly provided herein are suggested amounts of vitamin K that satisfy a current need in the area of bone supplementation.

According to the invention, the fat is emulsified together with the protein and sugar syrup during the early stages of preparation, favorably during mixing steps. As cooking progresses, simultaneous denaturation of the proteins and changes in the sugar entrap the fat in a homogenous fashion across the confectionery matrix. While not wishing to be bound in theory, electron microscopy shows that the supporting medium in caramels is the sugar phase (due to large percent in the formulation) with inclusion of fat and protein.

Because of the high temperatures of the cooking process, the vitamins are added only after the cooking steps to prevent degradation.

Other minerals that may be included in a confectionery prepared for supplements directed to bone health include sources of copper, manganese and zinc. Cooper may be used in an amount of from about 0.1 to 3 mg per piece. Manganese may be used in amounts of about 0.25 to 5 mg per piece. Zinc may be used in an amount of about 3 mg to 12 mg per piece.

The fat sources that may be included are those appropriate for making confectionery products, i.e., any commercial available fat, or mixture of any fat, such as, for example, hardened vegetable fat/oil; cocoa butter; milk fat; butter oil, whole butter or any fraction thereof; butter; hydrogenated soybean oil, hydrogenated vegetable oils (any single source vegetable oil or mixed vegetable oils). The level of fats used is preferably from about 3 wt. % to about 18 wt. %, more preferably from 3 wt. % to 15 wt. %, and most preferably about 9 wt. %.

The optional protein sources of the confectionery compositions may be selected from any number of known and commercially available sources. For example, the protein may be a milk component such as sweetened condensed skim milk (milk solids), condensed whole milk, evaporated milk, reconstituted milk powder, protein hydrolysates, milk protein concentrate, total milk protein, or mixtures thereof. Alternatively or in addition to the milk component, other sources of protein may be used such as a soy protein; a fish protein; egg protein; or a mixture thereof. Additionally, whey proteins may be substituted as they provide a less expensive substitute for milk solids. Whey proteins include sweet (rennet) whey powder, whey protein concentrates or high calcium fractionated whey products. When whey proteins are selected as a protein, either as the single source or in combinations with other proteins, it should be taken into account that the whey products are more reactive in Maillard reactions than other milk proteins. The Maillard reaction (reaction of the amino groups in the protein and the glycosidic hydroxyl, reducing groups) of the sugars results in a brown condensation pigment that may contribute to flavor and color development of the confectionery particularly for caramel, butterscotch or "brown" flavors, but is generally undesirable for fruit or mild flavors. Preferably, the protein source is a nonfat milk based protein. Preferably the protein is employed in amounts from about 0 to 5 wt. %, more preferably from 1 to 5 wt. %, and most preferably from 2 to 4 wt. %.

A stabilizer agent may be added to prevent excessive denaturization of the protein which is important in providing texture for calcium supplements. Stabilizers known in the food industry may be used, such as disodium phosphate and sodium citrate, in amounts of up to 0.5 wt. %, more preferably 0.01 to 0.5 wt. %, most preferably 0.05 to 0.01 wt. %.

When the confectionery is formulated as a fruit flavored chewy morsel, preferably the flavor component includes from about 0.1 wt. % to 2 wt. % of an encapsulated citric acid (as widely commercially available or within the skill of those familiar with the art to prepare). From a processing aspect, the encapsulated citric acid is preferable because the premature reaction between the citric acid and the calcium source, e.g., calcium carbonate, is substantially prevented by the encapsulation of the citric acid. For example, when the citric acid is not encapsulated, the processing of the confectionery product is difficult due to the release of carbonate dioxide and subsequent foaming of the preparation. The citric acid functions to provide tartness of the fruit flavored confectionery products. Further, the encapsulated citric acid substantially prevents the inversion of sucrose when it is employed as one of the carbohydrate components. Inversion is the hydrolysis of sucrose to its component monosaccharides, dextrose and fructose. Increased levels of fructose will result in increased hygroscopicity (defined as tendency to pick up moisture resulting in a sticky or crystallized product), an undesired property of a confectionery, and thus are preferably avoided by formulation adjustments.

Any number of processes within the skill of one familiar with candy making may be used for preparing the confectionery. Preferred is a process comprising heating said carbohydrate, fat, and optional protein mixture to form a precooked mass; incorporating a fortifying component to said precooked mass; and cooling said fortified precooked mass to form a fortified confectionery product. Preferably, a hydrocolloid (such as, for example, carrageenan, locust bean gum, furcellaran, agar, gellan, or mixtures thereof, most preferably carrageenan) is used. The hydrocolloid, (from about 0.01 to about 0.2 wt. %, preferably 0.08 to 0.09 wt. %) is dispersed in an aqueous solution. A portion of selected carbohydrate (up to about 1 wt. % of a monosaccharide or disaccharide, most preferably fructose, sucrose or a mixture thereof) may be present in the aqueous dispersion or alternatively the entire source carbohydrate is added after the initial mixing of the aqueous dispersion containing the hydrocolloid. Once the aqueous dispersion has agitated, the carbohydrate (or remaining portion of carbohydrate); milk product (preferably sweetened condensed skim milk) and fat (optionally in a form contributing to flavor such as cocoa butter) are heated with a food grade emulsifying (used in a range of 0 to 5 wt. %, more preferably 0.05 to 0.5 wt. %, agent, preferably lecithin or glycerol manostearate) to form an emulsion. The resulting carbohydrate-fat-protein mixture is then heated to a temperature ranging from about 220°–270° F., preferably 230°–245° F. if processing is by a batch open pan cooking to form a precooked mass. For a continuous manufacture, the carbohydrate-fat-protein mixture is passed through scraped surface evaporators and then transferred to carameliser kettles and cooked at about 220°–270° F., preferably 230°–245° F. to form a precooked mass. To the precooked mass, additional flavors and food grade dyes (such as chocolate liquor, vanilla, food colors, caramel colors, and fruit flavor) may be added. Additionally included to the precooked mass is the fortifying component, preferably a calcium salt, other mineral salts (such as magnesium, zinc, copper, and the like) and vitamins (such as preferred vitamins D, K, and mixtures thereof). The fortifying component may be added in any step, including addition during different steps. If the confectionery is a fruit flavored variety having an encapsulated citric acid present, the encapsulated citric acid is preferably added to the precooked mass once the mixture is slightly cooled (i.e., 175° F. or less).

Any number of miscellaneous ingredients may be included as recognizable to one skilled in the art. For example, any one or a combination of the following may be included: acidulants (citric acid, fumaric acid, lactic acid gluconic acid; or a mixture), Veltol™, Talin™, Salatrim™, sugar ester, gums, gelatin, carrageenan, cellulose, ginseng, active phyto chemicals such as ferulic acid (apples), beta carotene (carrots, sweet potatoes), capsicanoids (peppers), anthocyanidins (berries), bioflavanoids like hesperidin or quercetin (citrus fruits), d-limonene (citrus fruits), isothiocyanates (cruciferous vegetables), s-allyl cysteine and S-methyl cysteine (garlic), 6-gingerol (ginger), ellagic acid (grapes, tea), polyphenol catechins (green tea), allyl sulfides (onion family), phytosterols and isoflavones (soybeans), lycopene (tomatoes), curcumin (tumeric) and so on. Colors that may be included may be artificial or natural. Examples of natural colors are caramel colors which are derived from pure caramelized sugars specific carbohydrates which are heated with accelerators such as ammonia. Also vitamins such as beta carotene or the B vitamins may impart yellow and orange colors which may be compatible with certain confectionery flavors.

It is to be understood that various modifications to the invention will be apparent to and can readily be made by those skilled in the art, given the disclosure herein, without departing from the scope and materials of this invention. It is not, however, intended that the scope of the claims appended hereto be limited to the description as set forth herein, but rather that the claims be construed as encompassing all features of patentable novelty which reside in the present invention, including all features which would be treated as equivalents thereof by those skilled in the art to which the invention pertains. It is also noted that the examples given herein are intended to illustrate and not to limit the invention.

EXAMPLES

The Table hereinafter provides particularly desirable confectionery products prepared in accordance with the invention.

TABLE 1

PREFERRED AMOUNTS OF INGREDIENT PER 100 g OF CONFECTIONERY

|  | Fruit Flavored | Chocolate | Caramel |
|---|---|---|---|
| Fat, g | 8–12 | 8–12 | 8–12 |
| Carbohydrate, g | 50–60 | 50–60 | 50–60 |
| Protein, g | 2–4 | 2–4 | 2–4 |
| Calcium Carbonate g | 12.5–32 | 12.5–32 | 12.5–32 |
| Magnesium Phosphate g | 3.6–12 | 3.6–12 | 3.6–12 |
| Zinc Sulfate, mg | 0.28–0.34 | 0.28–0.34 | 0.28–0.34 |
| Manganese Sulfate, g | 0.05–0.40 | 0.05–0.40 | 0.05–0.40 |
| Cupric Sulfate, mg | 20–65 | 20–65 | 20–65 |
| Sodium Fluoride, mg | 18.4–73.8 | 18.4–73.8 | 18.4–73.8 |
| Silicon Dioxide, g | 0.089–0.36 | 0.089–0.36 | 0.089–0.36 |
| Sodium Borate, g | 0.04–0.12 | 0.04–0.12 | 0.04–0.12 |
| Vitamin K1, g | 0.03–0.05 | 0.03–0.05 | 0.03–0.05 |
| Vitamin D, IU | 800–2000 | 800–2000 | 800–2000 |
| Misc. Vitamins | Up to 300 mg | Up to 300 mg | Up to 300 mg |
| Flavors, color, and vitamins | Up to 5 g | Up to 5 g | Up to 5 g |

These ingredients deliver the following nutrients:

Copper: 0.5–1 mg/ piece

Manganese: 1–2.5 mg/piece

Vitamin D: 50–100 IU/piece

Vitamin K: 10–50 mcg/piece.

Zinc: 5–7.5 mg/piece

Magnesium: 30–100 mg/piece

Silicon: 2.5–5 mg/piece

Boron: 0.5–1.55 mg/piece

Fluoride 0.5–2 mg/piece

EXAMPLE 1

Nine g of a commercially sourced carrageenan was blended with 18 g of sugar and dispersed into 60 g of water using a Hobart mixer. Two hundred g of corn syrup was added to the above solution and stirred until all lumps were dispersed; then, 2620 g of corn syrup and 2190 g of sweetened condensed skim milk were added. Four hundred ten g of cocoa butter was heated to 120°–130° F., and 15 g of lecithin was added with agitation. The emulsified fat was then blended into the above mixture with medium agitation. After the addition of fat was completed, the speed of the mixer was adjusted to the highest level, and the mixture was agitated for about 5 minutes to form a good emulsion. The emulsion was transferred to a kettle with script surface and temperature control devices and was heated until the temperature reached to 245°–246° F. to produce the caramel base. Then, 441 g of natural chocolate liquor and 6 g of vanillin were added to the above mixture. Four thousand five hundred g of the caramel base was mixed with 1300 g of calcium carbonate, 300 g of magnesium phosphate, and 0.3 g of vitamin D powder (400,000 IU/g) for about 2 minutes or until a smooth texture was formed.

The product was poured onto a cooling table to form a slab and left at room temperature and cooled and thereafter processed by cutting into pieces and wrapping.

EXAMPLE 1a

Carrageenan (1.8 g) was blended with 30 g of fructose, then dispersed into 20 g of water in a Hobart mixer with thorough agitation, set at a speed of 2. Then, 200 g of warm (130° F.) high maltose corn syrup and 360 g of high fructose corn syrup were added to the above mix and stirred to eliminate lumps, after which sweetened condensed skim milk (438 g) was added to the mixture. Cocoa butter (82 g) was completely melted at 120°–130° F., lecithin (3 g) was added with agitation. The emulsified fat was slowly added to the above mixture with the agitator set at a speed of 2. After completing the addition of fat, the speed was set at the highest level and agitated to form a good emulsion. The emulsion was transferred to a kettle with script surface and temperature control devices and cooked to 235° F.. Melted natural chocolate liquor (88 g) and vanillin (1.2 g) were added to the base. Then, 450 g of the caramel base was placed in a Hobart mixer with the speed set at 1 and 130 g of calcium carbonate, 30 g of magnesium phosphate, and 0.025 g of vitamin D powder (400,000 IU/g) were added and mixed to a smooth texture.

The product was poured onto the slab and then left at room temperature to cool and thereafter further processed by cutting and wrapping.

EXAMPLE 2

Nine g of carrageenan was blended with 18 g of sugar then dispersed into 60 g of water in a Hobart mixer and thoroughly mixed. Then, 200 g of corn syrup was added and stirred until there were no lumps, after which the remaining 2270 g of corn syrup, 2500 g of sweetened condensed skim milk, 181 g of sugar were added. Three hundred twenty-five g of milk fat and 325 g of hydrogenated vegetable fat were completely melted at 120°–130° F., and 15 g of lecithin was blended into the fat. The emulsified fat was slowly added to the above mixture, with the speed of the mixer set at 2. After completing the addition of fat, the speed of the mixer was adjusted to the highest gear and agitated thoroughly.

The prepared emulsion was transferred to a kettle with script surface and temperature control devices and cooked to 245°–246° F. to produce a caramel base. Then, 4500 g of the base was placed in a Hobart mixer, and 1300 g of calcium carbonate, 300 g of magnesium phosphate, 5 g of caramel flavor, and 15 g of vanilla flavor, 4 g of 10% brown shade, and 0.3 g of vitamin D powder (400,000 IU/g) were added and mixed to a smooth texture.

The product was poured onto the slab and left at room temperature to cool and further processed as previously described.

EXAMPLE 2a

Carrageenan (1.8 g) was blended with 40 g of sucrose and dispersed into 20 g of water in a Hobart mixer and thoroughly mixed. Then, 160 g of high maltose corn syrup (130° F.) and 330 g high fructose corn syrup were added to the above mix and stirred until no lumps remained, after which 500 g sweetened condensed skim milk was added. 66 g butter and 60 g hydrogenated vegetable fat were completely melted at 120°–130 F. and lecithin was added and blended for about 2 minutes. The emulsified fat was slowly added to the above mixture, with the agitator set at a speed 2. After the addition of fat was completed, the speed of mixer was turned to the highest gear and agitated thoroughly. The formed emulsion was transferred to a kettle with script surface and temperature control devices and cooked to 235° F. The heat was turned off, and 450 g of the precooked caramel base was mixed in a Hobart mixer with 130 g of calcium carbonate, 30 g of magnesium phosphate, 1.05 g of caramel flavor, 0.35 g of vanilla flavor, 3.5 g natural caramel color, 0.025 g of vitamin D powder (400,000 IU/g), and 0.042 g of Vit. K1.

The product was poured onto the slab and left at room temperature to cool and further processed.

EXAMPLE 3

Carrageenan (2.2 g) was blended with 28 g of fructose and 26 g sucrose and then dispersed into 742 g of warm corn syrup and thoroughly blended in a Hobart mixer. Then, sweetened condensed skim milk (250 g) was added and blended to eliminate lumps. Milk fat (64 g) and partially hydrogenated vegetable oil (64 g) were melted together at 120°–130° F., and lecithin (3 g) was added and mixed for 2 minutes. The emulsified fat was slowly added to the above mixture and thoroughly agitated for about 5 minutes to form a good emulsion. The emulsion was transferred to a kettle equipped with script surface and temperature control devices and cooked to temperature 235° F. Then, 450 g of precooked caramel base was placed in a Hobart mixer and mixed with calcium carbonate (130 g), magnesium sulfate (30 g), 1 g red 40 solution (1%), strawberry flavor (7 g), and 0.042 g of vitamin K1, and vitamin D3 powder (400,000 IU/g). The product was poured onto the slab, cooled and further processed.

EXAMPLE 3a

Carrageenan (2.2 g) was blended with 28 g of fructose and 26 g sucrose and thereafter thoroughly dispersed into 742 g of warm corn syrup in a Hobart mixer. Then, 250 g of sweetened condensed skim milk was added and blended. Hydrogenated vegetable fat (91 g) was heated to 120°–130° F. and blended with 3 g of lecithin. The fat blend was added to the above mixture and agitated thoroughly to form an emulsion which was cooked at a temperature of 235° F. to produce a caramel base. Then 450 g of the caramel base was blended in a Hobart mixer with 130 g of calcium carbonate, 30 g of magnesium sulfate, 1 g red 40 solution (1%), 7 g strawberry flavor, and 0.025 g of vitamin D powder (400,000 IU/g) to a smooth texture. The mixture was cooled to 165° F. or less and blended with 10 g of encapsulated citric acid. The product was thereafter cooled and processed.

EXAMPLE 4

A cellulose gel paste was made by adding cellulose gel (1.5 g) to 92 g of cold water in a high shear mixer for 10 minutes. In addition, a mixture of 1.5 g carrageenan, 93.5 g of sucrose, 20 g of fructose, 307 g of sweetened condensed skim milk, and 1.5 g of salt were blended. 50 g of butter, 2.0 g glycerol monostearate (GMS), and 2.0 g of lecithin were preblended and slowly added to the above mixture along with cellulose gel paste and agitated thoroughly. Then, 200 g of corn syrup 42DE and 30.4 g of 62DE corn syrup were added and blended. All of the above mix was transferred to a kettle with script surface and temperature control devices and cooked to 245°–246° F. to produce a caramel base. After cooking the base, 450 g was transferred to a mixer and blended with 130 g of calcium carbonate, 30 g of magnesium phosphate, 0.9 ml caramel flavor, 0.3 g of vanilla flavor, 0.025 g vitamin D3 powder (400,000 IU/g), and 0.4 ml of brown shade (5%) solution. The product was poured onto the slab, cooled and processed.

EXAMPLE 5

A cellulose gel paste was prepared by adding cellulose gel (1.5 g) to 92 g of cold water in a high shear mixer for 10 minutes. In addition, a mixture of 1.5 carrageenan, 93.5 g of sucrose, 20 g of fructose, 307 g of sweetened condensed skim milk, and 1.5 g of salt were blended. 25 g of cocoa butter, 2.0 g glycerol monosterate, and 2.0 g of lecithin were preblended and slowly added to the above mixture along with the cellulose gel paste and thoroughly agitated to form a good emulsion. 200 g of corn syrup 42DE and 30.4 g of 62DE corn syrup were added to this mix. Then, the above mix was transferred to a kettle with script surface and temperature control devices and cooked to 245°–246° F. to produce a caramel base. After the cooking was completed, 25 g of natural chocolate liquor and 0.6 g vanillin were added and mixed for about 2 minutes. Then, 450 g of caramel base was transferred to a mixer and mixed with 130 g calcium carbonate, 30 g of magnesium phosphate, and 0.042 g of Vit. K1, and 0.025 g of vitamin D3 powder (400,000 IU/g). The product was poured onto the slab, cooled and further processed.

EXAMPLE 6

A cellulose gel paste was prepared by adding cellulose gel (1.5 g) to 92 g of cold water in a high shear mixer for 10 minutes. In addition, a mixture of 1.5 g of carrageenan, 93.5 g of sucrose, 20 g of fructose, 307 g of sweetened condensed skim milk, and 1.5 g of salt were blended together. 50 g of partially hydrogenated vegetable oil, 2.0 g glycerol monosterate, and 2.0 g of lecithin were preblended and slowly added to the above mixture along with the cellulose gel paste at the same time and thoroughly agitated. Next, 200 grams of corn syrup 42DE and 30.4 grams of 62DE corn syrup were added. All of the above mix was transferred to a kettle with script surface and temperature control devices and cooked to 245°–246° F. to produce a caramel base. After the cooking was completed, 450 g of base was transferred to a mixer and mixed with 130 g calcium carbonate, 30 g of magnesium phosphate, 10 g encapsulated citric acid, 0.9 ml caramel flavor, 7 g strawberry flavor, 0.025 g vitamin D3 powder (400,000 IU/g), and 1 ml of red 40 solution (1%). The product was poured onto the slab, cooled and further processed.

EXAMPLE 7

Sixteen g egg protein was mixed with 45 g of sugar and then soaked in 60 ml of cold water for at least 2 hours. Then, 90 g of 42DE corn syrup was preheated to 120° F., added to the egg protein solution, and beaten with a wire whipper for 5 minutes. In addition, a syrup made of 325 g sugar, 293 g 42DE corn syrup, and 80 g of water was cooked to 255° F. The syrup was slowly added to the egg protein solution and allowed to mix in evenly. Next, with the machine still on low speed, a paste of 50 g shortening, 0.5 g of lecithin, 0.5 ml of strawberry flavor, and 1 g of red 40 solution (1%) was added along with 225 g of calcium carbonate, 12 g of magnesium oxide, 0.044 g of vitamin D3 (400,000 IU/g). The product was poured onto the slab, cooled and further processed.

EXAMPLE 8

The same as Example 1 except calcium citrate was used in formula.

EXAMPLE 9

The same as Example 1a, except 240 grams of evaporated skim milk and 332 grams of sugar replaced the sweetened condensed skim milk.

EXAMPLE 10

The same as Example 1 except magnesium oxide replaced magnesium phosphate.

EXAMPLE 11

The same as Example 1, but tricalcium phosphate was used.

EXAMPLE 12

The same as Example 1 with calcium from egg shell.

EXAMPLE 13

The same as Example 1 except milk calcium was used.

EXAMPLE 14

The confectionery products of Examples 1 through 13 were cut into individually wrapped (foil or wax paper) pieces of from about 5 to 7 grams (1" by 1"). A taste test was administered to a panel. The taste test results showed acceptable ratings under both the "chalky" and "gritty" characterization.

That which is claimed is:

1. A caramel confection comprising from about 0.2 wt. % to about 45 wt. % of a fortifying component selected from the group consisting of a vitamin source, a mineral source, or a mixture thereof; from about 3 to about 18 wt. % of a fat; from about 0 to about 10 wt. % of a protein and from about 40 wt. % to about 70 wt. % of a carbohydrate comprising at least one reducing sugar and at least one non-reducing sugar, wherein the weight ratio of the reducing sugar:non-reducing sugar of is from about 1:02 to 1:1.

2. A caramel confection according to claim 1 wherein the weight ratio of said reducing sugar:non-reducing sugar is from about 1:0.3 to about 1:0.8.

3. A caramel confection according to claim 2 wherein the non-reducing sugar is sucrose.

4. A caramel confection according to claim 3 wherein the carbohydrate is present in an amount ranging from 50 to 60 wt. %.

5. A caramel confection according to claim 4 wherein the fortifying component comprises calcium present in an amount ranging from about 2 to about 32 wt. % of the total weight of the caramel confection.

6. A caramel confection according to claim 5 wherein the calcium is supplied by a calcium source selected from the group consisting of calcium carbonate, calcium citrate, calcium phosphate, calcium lactate, calcium gluconate, calcium fumarate, calcium aspartate, tricalcium citrate tetrahydrate, and mixtures thereof.

7. A caramel confection according to claim 6 wherein the calcium is calcium carbonate.

8. A caramel confection of claim 3, wherein said reducing sugar is selected from the group consisting of corn syrup, high fructose corn syrup, corn syrup solid, high maltose corn syrup, fructose and mixtures thereof.

9. A caramel confection of claim 8, wherein the weight ratio of reducing sugar:non-reducing sugar is within 1:0.3 to 1:0.44.

10. A caramel confection according to claim 1 wherein the fortifying component comprises calcium carbonate present in an amount ranging from about 0.4 to about 32 wt. % of the total weight of the caramel confection.

11. A caramel confection according to claim 10 wherein the calcium carbonate is present in an amount ranging from 12.5 wt. % to 32 wt. % calcium carbonate and the calcium carbonate has a media particle size of from about 2 to about 10 microns.

12. A caramel confection according to claim 11 wherein the fortifying component further includes vitamin D, vitamin K, and a magnesium source.

13. A caramel confection according to claim 12 wherein the magnesium source is selected from the group consisting of magnesium oxide, magnesium phosphate, magnesium carbonate, and combinations thereof and the fortifying component further comprises zinc, boron, and fluoride, manganese, copper, silicon and the vitamin K is vitamin K1.

14. A caramel confection according to claim 13 wherein the magnesium is a magnesium phosphate present in an amount ranging from 4.8 wt. % to about 23.9 wt. % of the total weight of the caramel confection.

15. A caramel confection according to claim 13 wherein the magnesium phosphate is present in an amount ranging from 4.8 to 12 wt. % of the total weight of the caramel confection; the calcium carbonate is present in an amount ranging from about 12.5 to 32 wt. % of the total weight of the caramel confection; the protein is present in an amount ranging from 1 to 4 wt. % of the total weight of the caramel confection; the vitamin K1 is present in an amount ranging from 0.0001 to 0.0003 wt. % of the total weight of the caramel confection; and the carbohydrate component is present in an amount ranging from 50 to 60 wt. % of the total weight of the caramel confection.

16. A caramel confection according to claim 15 wherein the caramel confection further comprises zinc sulfate, manganese sulfate, cupric sulfate, sodium fluoride, silicon dioxide, sodium borate, or a mixture thereof.

17. A caramel confection according to claim 16 wherein the fat is selected from the group consisting of hardened vegetable oil, cocoa butter, milk fat, butter oil, butter, hydrogenated soybean oil, hydrogenated vegetable oils, and combinations thereof present in an amount ranging from 3 to 15 wt. %; the protein comprises a milk based protein component selected from the group consisting of sweetened condensed skim milk, condensed whole milk, evaporated milk, milk protein concentrate, total milk protein, or mixtures thereof in an amount ranging from 2 to 4 wt. %; and the carbohydrate comprises a combination of sucrose and a reducing sugar selected from the group consisting of corn syrup, high fructose corn syrup, corn syrup solid, high maltose corn syrup, fructose, invert sugar, and mixtures thereof in an amount ranging from 50 to 60 wt. %.

18. A caramel confection according to claim 1 wherein the fortifying component is present in an amount ranging from 0.2 wt. % to about 40 wt. %, and wherein the caramel confection exhibits a water activity (Aw) of below about 0.65.

19. A caramel confection of claim 1, wherein the weight ratio of the reducing sugar:non-reducing sugar is from 1:0.2 to 1:1.

20. A caramel confection comprising from about 0.2 wt. % to about 45 wt. % of a fortifying component selected from the group consisting of a vitamin source, a mineral source, or a mixture thereof; from about 40 wt. % to about 70 wt. % of a carbohydrate comprising at least one reducing sugar and one non-reducing sugar, wherein the weight ratio of reducing sugar:non-reducing sugar is of from about 1:0.2 to 1:1 and wherein the caramel confection exhibits a water activity (Aw) of below about 0.65 and the caramel confection has substantially no crystals with a particle size greater than 35 microns.

21. A caramel confection according to claim 20 wherein the caramel confection has a shelf life of up to about 365 days.

22. A caramel according to claim 21 wherein the fortifying component comprises a calcium carbonate present in an amount ranging from 12.5 to 32 wt. % of the total weight of the caramel confection.

23. A caramel confection according to claim 22 wherein the fortifying component further includes from 4.8 to 12 wt. % of magnesium phosphate and the caramel confection has a Aw between 0.4 to about 0.55.

24. A caramel confection of claim 21, wherein the carbohydrate comprises sucrose and a non-reducing sugar selected from the group consisting of a 42 DE corn syrup, a 62/63 DE corn syrup, a high fructose corn syrup, a 42 DE high maltose corn syrup, a fructose and combinations thereof.

25. A fruit flavored caramel confection comprising from about 0.2 wt. % to about 65 wt. % of a fortifying component including a vitamin source, a mineral source, or a mixture thereof; from about 3 to about 18 wt. % of a fat; from about 40 wt. % to about 70 wt. % of a carbohydrate wherein the carbohydrate comprises at least one reducing sugar and one non-reducing sugar and the weight ratio of the reducing sugar:non-reducing sugar is from about 1:0.2 to 1:1, and from about 0.1 wt. % to 2 wt. % of an encapsulated citric acid.

26. A caramel confection according to claim 25 wherein the fortifying component comprises calcium carbonate present in an amount ranging from 12.5 to 32 wt. % of the total weight of the caramel confection and the carbohydrate comprises at least one reducing sugar and one non-reducing sugar and the weight ratio of the reducing sugar:non-reducing sugar is from about 1:0.2 to 1:1.

27. A caramel confection according to claim 26 wherein the calcium carbonate has a media particle size of from about 2 to about 10 microns.

28. A caramel confection according to claim 25 wherein the weight ratio of the reducing sugar:non-reducing sugar is from 1:0.2 to 1:1.

29. A caramel confection comprising from about 0.2 wt. % to about 45 wt. % of a fortifying component selected from the group consisting of a vitamin source, a mineral source, or a mixture thereof; from about 3 to about 18 wt. % of a fat; from about 40 wt. % to about 70 wt. % of a carbohydrate comprising from about 10 to 50 wt. % of an oligosaccharide, a polysaccharide or a mixture thereof and from about 50 to about 90% of a monosaccharide, a disaccharide, or a combination thereof and the carbohydrate comprises at least one reducing sugar and one non-reducing sugar and the weight ratio of the reducing sugar:non-reducing sugar is from about 1:0.2 to 1:1.

30. A caramel confection according to claim 29 wherein the oligosaccharide, polysaccharide or mixture thereof is present in an amount from 20 to 40 wt. %.

31. A caramel confection according to claim 29 wherein the oligosaccharide, polysaccharide or mixture thereof is present in an amount from 22 to 36 wt. %.

32. A process for preparing a caramel confection comprising cooking a confectionery comprising from about 3 to about 18 wt. % of a fat; from about 40 wt. % to about 70 wt. % of a carbohydrate comprising at least one reducing sugar and one non-reducing sugar in a weight ratio of from about 1:0.2 to 1:1 of reducing sugar:non-reducing sugar, and from about 0 to about 10 wt. % of a protein to form a precooked mass; adding from about 0.2 wt. % to about 45 wt. % of a fortifying component selected from the group consisting of a vitamin source, a mineral source, or a mixture thereof, to the thus fanned precooked mass to form a fortified caramel confectionery product and cooling the fortified caramel confectionery product.

33. A process according to claim 32 wherein the fortifying component comprises calcium carbonate present in an amount ranging from 12 to 32 wt. % of the caramel confection.

34. A process according to claim 33 wherein the caramel confection is a fruit flavored chew and wherein the fruit flavor is at least partially imparted by the use of an encapsulated citric acid.

35. A process according to claim 34 wherein the process further comprises incorporating a hydrocolloid, which is dispersed in an aqueous solution, in the confectionery prior to cooking, wherein the hydrocolloid is selected from the group consisting of carrageenan, locust bean gum, furcellaran, agar, gellan, and mixtures thereof present in an amount of about 0.01 to about 2 wt. %.

36. A process according to claim 34 wherein the confectionery further comprises employing from about 0.1 to 5 wt. % protein and from about 0.01 to 0.1 wt. % of a stabilizer agent.

37. A process according to claim 36 wherein said fortifying component comprises a calcium salt, a magnesium salt, a zinc salt, a copper salt, vitamin D, and vitamin K.

38. A process according to claim 37 further comprising adding an encapsulated citric acid to the precooked mass once the mass has cooled to at least about 175° F.

39. A caramel confection comprising from about 0.2 wt. % to about 45 wt. % of calcium carbonate, vitamin D, and vitamin K from about 3 to about 18 wt. % of hydrogenated soybean oil; from about 0 to about 10 wt. % of sweetened condensed milk and from about 40 wt. % to about 70 wt. % of a carbohydrate comprising corn syrup and a non-reducing sugar, wherein the weight ratio of the corn syrup:non-reducing sugar is of from about 1:0.2 to 1:1.

40. A caramel confection comprising from about 0.2 wt. % to about 45 wt. % of calcium carbonate, vitamin D, and vitamin K, from about 3 to about 18 wt. % of a commercially available fat; from about 0 to about 10 wt. % of milk component and from about 40 wt. % to about 70 wt. % of a carbohydrate comprising corn syrup and a non-reducing sugar, wherein the weight ratio of the corn syrup:non-reducing sugar is of from about 1:0.2 to 1:1.

41. A caramel confection comprising from about 0.2 wt. % to about 45 wt. % of calcium carbonate, vitamin D, and vitamin K, from about 3 to about 18 wt. % of cocoa butter; from about 0 to about 10 wt. % of non-fat milk and from about 40 wt. % to about 70 wt. % of a carbohydrate comprising corn syrup and a non-reducing sugar, wherein the weight ratio of the corn syrup:non-reducing sugar is of from about 1:0.2 to 1:1.

42. A confectionary delivery system comprising from about 0.2 wt. % to about 45 wt. % of calcium carbonate, vitamin D, and vitamin K, from about 3 to about 18 wt. % of cocoa butter; from about 0 to about 10 wt. % of a non-fat milk and about 40 wt. % to about 70 wt. % of a carbohydrate comprising corn syrup and a non-reducing sugar wherein the weight ratio of the reducing sugar:non-reducing sugar is from about 1:0.2 to 1:1.

43. A confectionary delivery system according to claim 42 wherein the weight ratio of said reducing sugar:non-reducing sugar is from about 1:0.3 to about 1:0.8.

44. A confectionary delivery system according to claim 43 wherein the non-reducing sugar is sucrose.

45. A confectionary delivery system according to claim 44 wherein the carbohydrate is present in an amount ranging from 50 to 60 wt. %.

46. A confectionary delivery system according to claim 45 wherein the fortifying component comprises calcium present in an amount ranging from about 2 to about 32 wt. % of the total weight of the confectionery delivery system.

47. A confectionary delivery system according to claim 46 wherein the calcium is supplied by a calcium source selected from the group consisting of calcium carbonate, calcium citrate, calcium phosphate, calcium lactate, calcium gluconate, calcium fumarate, calcium aspartate, tricalcium citrate tetrahydrate, and mixtures thereof.

48. A confectionary delivery system according to claim 47 wherein the calcium is calcium carbonate.

49. A confectionary delivery system according to claim 44, wherein the reducing sugar is selected from the group consisting of corn syrup, high fructose corn syrup, corn syrup solid, high maltose corn syrup, fructose and mixtures thereof.

50. A confectionary delivery system according to claim 49, wherein the weight ratio of reducing sugar:non-reducing sugar is within 1:0.3 to 1:0.44.

51. A confectionary delivery system according to claim 42 wherein the fortifying component comprises calcium carbonate present in an amount ranging from about 0.4 to about 32 wt. % of the total weight of the confectionery delivery system.

52. A confectionary delivery system according to claim 51 wherein the calcium carbonate is present in an amount ranging from 12.5 wt. % to 32 wt. % calcium carbonate and the calcium carbonate has a media particle size of from about 2 to about 10 microns.

53. A confectionary delivery system according to claim 52 wherein the fortifying component further includes vitamin D, vitamin K, and a magnesium source.

54. A confectionary delivery system according to claim 53 wherein the magnesium source is selected from the group consisting of magnesium oxide, magnesium phosphate, magnesium carbonate, and combinations thereof and the fortifying component further comprises zinc, boron, and fluoride, manganese, copper, silicon and the vitamin K is vitamin K1.

55. A confectionary delivery system according to claim 54 wherein the magnesium is a magnesium phosphate present in an amount ranging from 4.8 wt. % to about 23.9 wt. % of the total weight of the confectionery delivery system.

56. A confectionery delivery system according to claim 54 wherein the magnesium phosphate is present in an amount ranging from 4.8 to 12 wt. % of the total weight of the confectionery delivery system; the calcium carbonate is present in an amount ranging from about 12.5 to 32 wt. % of the total weight of the confectionery delivery system; the protein is present in an amount ranging from 1 to 4 wt. % of the total weight of the confectionery delivery system; the vitamin K1 is present in an amount ranging from 0.0001 to 0.0003 wt. % of the total weight of the confectionery delivery system; and the carbohydrate component is present in an amount ranging from 50 to 60 wt. % of the total weight of the confectionery delivery system.

57. A confectionery delivery system according to claim 56 wherein the confectionery delivery system further comprises zinc sulfate, manganese sulfate, cupric sulfate, sodium fluoride, silicon dioxide, sodium borate, or a mixture thereof.

58. A confectionery delivery system according to claim 57 wherein the fat is selected from the group consisting of hardened vegetable oil, cocoa butter, milk fat, butter oil, butter, hydrogenated soybean oil, hydrogenated vegetable oils, and combinations thereof present in an amount ranging from 3 to 15 wt. %; the protein comprises a milk based protein component selected from the group consisting of sweetened condensed skim milk, condensed whole milk, evaporated milk, milk protein concentrate, total milk protein, or mixtures thereof in an amount ranging from 2 to 4 wt. %; and the carbohydrate comprises a combination of sucrose and a reducing sugar selected from the group consisting of corn syrup, high fructose corn syrup, corn syrup solid, high maltose corn syrup, fructose, invert sugar, and mixtures thereof in an amount ranging from 50 to 60 wt. %.

59. A confectionery delivery system according to claim 54 wherein the fortifying component is present in an amount ranging from 0.2 wt. % to about 40 wt. %, and wherein the confectionery delivery system exhibits a water activity (Aw) of below about 0.65

60. A confectionery delivery system of claim 42, wherein the weight ratio of the reducing sugar:non-reducing sugar is from 1:0.3 to 1:0.44.

61. A confectionery delivery system comprising from about 0.2 wt. % to about 45 wt. % of a fortifying component selected from the group consisting of a vitamin source, a mineral source, or a mixture thereof; from about 40 wt. % to about 70 wt. % of a carbohydrate comprising at least one reducing sugar and one non-reducing sugar, wherein the weight ratio of reducing sugar:non-reducing sugar is from about 1:0.2 to 1:1 and wherein the confectionery delivery system exhibits a water activity (Aw) of below about 0.65 and the confectionery delivery system has substantially no crystals with a particle size greater than 35 microns.

62. A confectionery delivery system according to claim 61 wherein the confectionery delivery system has a shelf life of up to about 365 days.

63. A confectionery delivery system according to claim 62 wherein the fortifying component comprises calcium carbonate present in an amount ranging from 12.5 to 32 wt. % of the total weight of the confectionery delivery system.

64. A confectionery delivery system according to claim 63 wherein the fortifying component further includes from 4.8 to 12 wt. % of magnesium phosphate and the confectionery delivery system has a Aw between 0.4 to about 0.55.

65. A confectionery delivery system according to claim 64, wherein the weight ratio of the reducing sugar:non-reducing sugar ratio is from 1:0.3 to 1:0.44.

66. A confectionery delivery system of claim 61, wherein the carbohydrate comprises sucrose and a non-reducing sugar selected from the group consisting of a 42 DE corn syrup, a 62/63 DE corn syrup, a high fructose corn syrup, a 42 DE high maltose corn syrup, a fructose and combinations thereof.

67. A fruit flavored confectionery delivery system comprising from about 0.2 wt. % to about 65 wt. % of the fortifying component including a vitamin source, a mineral source, or a mixture thereof; from about 3 to about 18 wt. % of a fat; from about 40 wt. % to about 70 wt. % of a carbohydrate, wherein the carbohydrate comprises at least one reducing sugar and one non-reducing sugar and the weight ratio of the reducing sugar:non-reducing sugar is from about 1:0.2 to 1:1, and from about 0.1 wt. % to 2 wt. % of an encapsulated citric acid.

68. A confectionery delivery system according to claim 67, wherein the fortifying component comprises calcium carbonate present in an amount ranging from 12.5 to 32 wt. % of the total weight of the confectionery delivery system and the carbohydrate comprises at least one reducing sugar and one non-reducing sugar and the weight ratio of the reducing sugar:non-reducing sugar is from about 1:0.2 to 1:1.

69. A confectionery delivery system according to claim 68, wherein the calcium carbonate has a media particle size of from about 2 to about 10 microns.

70. A confectionery delivery system comprising from about 0.2 wt. % to about 45 wt. % of fortifying component selected from the group consisting of a vitamin source, a mineral source, or a mixture thereof, from about 3 to about 18 wt. % of a fat; from about 40 wt. % to about 70 wt. % of a carbohydrate comprising from about 10 to 50 wt. % of an oligosaccharide, a polysaccharide or a mixture thereof and from about 50 to about 90 % of a monosaccharide, a disaccharide, or a combination thereof and the carbohydrate comprises at least one reducing sugar and one non-reducing sugar and the weight ratio of the reducing sugar:non-reducing sugar is from about 1:0.2 to 1:1.

71. A confectionery delivery system according to claim 70, wherein the oligosaccharide, polysaccharide or mixture thereof is present in an amount from 20 to 40 wt. %.

72. A confectionery delivery system according to claim 71 wherein the oligosaccharide, polysaccharide or mixture thereof is present in an amount from 22 to 36 wt. %.

73. A confectionery delivery system comprising from about 0.2 wt. % to about 45 wt. % of calcium carbonate, vitamin D, and vitamin K, from about 3 to about 18 wt. % of a hydrogenated soybean oil; from about 0 to about 10 wt. % of sweetened condensed milk and from about 40 wt. % to about 70 wt. % of a carbohydrate comprising corn syrup and a non-reducing sugar, wherein the weight ratio of the corn syrup:non-reducing sugar is from about 1:0.2 to 1:1.

74. A confectionery delivery system comprising from about 0.2 wt. % to about 45 wt. % of calcium carbonate, vitamin D, and vitamin K, from about 3 to about 18 wt. % of a commercially available fat; from about 0 to about 10 wt. % of a milk component and from about 40 wt. % to about 70 wt. % of a carbohydrate comprising corn syrup and a non-reducing sugar, wherein the weight ratio of the corn syrup:non-reducing sugar is from about 1:0.2 to 1:1.

75. A confectionery delivery system comprising from about 0.2 wt. % to about 45 wt. % of calcium carbonate, vitamin D, and vitamin K, from about 3 to about 18 wt. % of a cocoa butter, from about 0 to about 10 wt. % of non-fat milk and from about 40 wt. % to about 70 wt. % of a carbohydrate comprising corn syrup and a non-reducing sugar, wherein the weight ratio of the corn syrup:non-reducing sugar is from about 1:0.2 to 1:1.

76. A confectionery delivery system according to claim 75 wherein the weight ratio of said reducing sugar:non-reducing sugar is from about 1:0.3 to about 1:0.8.

77. A confectionery delivery system comprising from about 0.2 wt. % to about 45 wt. % of a fortifying component selected from the group consisting of a vitamin source, a mineral source, or a mixture thereof; from about 3 to about 18 wt. % of a fat; from about 0 to about 10 wt. % of a protein, a phytosterol, and from about 40 wt. % to about 70 wt. % of a carbohydrate comprising at least one reducing sugar and at least one non-reducing sugar, wherein the weight ratio of the reducing sugar:non-reducing sugar ratio of from about 1:0.2 to 1:1.

78. A confectionery delivery system according to claim 77 wherein the non-reducing sugar is sucrose and said reducing sugar is selected from the group consisting of corn syrup, high fructose corn syrup, corn syrup solid, high maltose corn syrup, fructose and mixtures thereof and the weight ratio of reducing sugar:non-reducing sugar is within 1:0.3 to 1:0.44.

* * * * *